US007010238B2

(12) United States Patent
Park

(10) Patent No.: US 7,010,238 B2
(45) Date of Patent: Mar. 7, 2006

(54) IMAGE PRINTING APPARATUS AND METHOD OF CONTROLLING THEREOF

(75) Inventor: Young-gook Park, Suwon (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 14 days.

(21) Appl. No.: 10/453,615

(22) Filed: Jun. 4, 2003

(65) Prior Publication Data

US 2003/0223767 A1 Dec. 4, 2003

(30) Foreign Application Priority Data

Jun. 4, 2002 (KR) ...................... 10-2002-0031219
Jan. 15, 2003 (KR) ...................... 10-2003-0002814

(51) Int. Cl.
*G03G 15/043* (2006.01)
*G03G 15/16* (2006.01)

(52) U.S. Cl. .......................................... 399/51; 399/66

(58) Field of Classification Search .................. 399/51, 399/66; 347/132, 133

See application file for complete search history.

(56) References Cited

U.S. PATENT DOCUMENTS 6,639,617 B1 * 10/2003 Yokogawa .................. 399/51
6,750,893 B1 * 6/2004 Jeong .......................... 399/51
2003/0030716 A1 * 2/2003 Jeong ......................... 347/132

FOREIGN PATENT DOCUMENTS

JP 2001100469 A * 4/2001
JP 2002116641 A * 4/2002
JP 2003005537 A * 1/2003

* cited by examiner

*Primary Examiner*—Sophia S. Chen
*Assistant Examiner*—Ryan Gleitz
(74) *Attorney, Agent, or Firm*—Staas & Halsey LLP

(57) ABSTRACT

An image printing apparatus and method thereof. The apparatus includes a photosensitive medium, and a transfer roller to transfer an image developed on the photosensitive medium with a developer to a fed paper, a printing engine state diagnosing portion to detect an effective resistance between the photosensitive medium and the transfer roller, a controller to determine a transfer voltage to be supplied to the transfer roller to print according to the effective resistance value in a printing engine driving condition determining mode, and determine a driving voltage for a printing mode with respect to a light source of the apparatus based on the determined transfer voltage, and a light source drive unit to drive the light source according to the driving voltage for the printing mode under the control of the controller.

14 Claims, 5 Drawing Sheets

IMAGE PRINTING APPARATUS AND METHOD OF CONTROLLING THEREOF

CROSS-REFERENCE TO RELATED APPLICATIONS

This application claims the benefit of Korean Application No. 2002-31219, filed Jun. 4, 2002, and Korean Application No. 2003-2814, filed Jan. 15, 2003, in the Korean Intellectual Property Office, the disclosures of which are incorporated herein by reference.

BACKGROUND OF THE INVENTION

1. Field of the Invention

The present invention relates to an image printing apparatus and a method of controlling the same, and more particularly, to an image printing apparatus to determine a level of driving voltage of a light source according to the condition of a system to perform a printing, and a method of controlling the same.

2. Description of the Related Art

An image printing apparatus such as a photocopier or a printer prints an image on recording paper. The image printing apparatus may use either an ink-jet method or a laser printing method based upon the method of a printing engine of the apparatus. Recently, the laser printing method has been widely used to perform a high speed printing operation in the image printing apparatus.

The printing engine employing the laser printing method includes a light-scanning device, a photosensitive medium to form an electrostatic latent image corresponding to the light emitted from the light scanning device, a developing unit to develop the electrostatic latent image formed on the photosensitive medium, and a transfer device to transfer the image developed on the photosensitive medium by the developing unit to a recording medium.

A driving voltage must be maintained at a predetermined level with respect to a light source of the light-scanning device of the printing engine. Also, a method to compensate for the aging process of the printing engine monitors a partial amount of the light emitted from the light source and adjusts the driving voltage of the light source to thereby project a constant intensity of light over time.

Although the printing quality is determined by the intensity of light emitted from the light source, it also depends on varying characteristics of the photosensitive medium. Therefore, the conventional method of controlling the driving voltage, which only keeps a certain intensity of light emitted from the light source, cannot sufficiently compensate for the deteriorated printing quality caused by the aging process of the printing engine.

SUMMARY OF THE INVENTION

Accordingly, it is an aspect of the present invention to solve the above problems of the related designs.

It is another aspect of the present invention to provide an image printing apparatus capable of adjusting respective driving conditions of the components of a printing engine according to a variable of the printing engine, thereby maintaining printing quality, and a controlling method thereof.

Additional aspects and advantages of the invention will be set forth in part in the description which follows and, in part, will be obvious from the description, or may be learned by practice of the invention.

The foregoing and/or other aspects of the present invention are achieved by providing a photosensitive medium; a light scanning unit including a light source to emit a light beam onto the photosensitive medium; a developing portion to develop an electrostatic latent image formed on the photosensitive medium by the light scanning unit with a developer; a transfer roller to transfer the image developed on the photosensitive medium with the developer to a fed paper; a printing engine state diagnosing portion to detect an effective resistance value of the photosensitive medium and the transfer roller; a controller to determine a transfer voltage to be supplied to the transfer roller for printing according to the effective resistance value in a printing engine driving condition determining mode, and to determine a driving voltage for a printing mode with respect to the light source of the light scanning unit based on the determined transfer voltage; and a light source drive unit to drive the light source according to the driving voltage in the printing mode under the control of the controller.

The image printing apparatus may further include a transfer voltage adjusting portion to variably adjust the transfer voltage, wherein the controller controls the transfer voltage adjusting portion to supply a test voltage to the transfer roller, the test voltage gradually increasing in a predetermined pattern, and the printing engine state diagnosing portion detects the effective resistance value in the printing engine driving condition determining mode.

The printing engine state diagnosing portion may include a current detecting portion to detect an electric current flowing from the transfer roller to the photosensitive medium corresponding to the test voltage; and a comparison portion to compare the electric current detected by the current detecting portion with a preset target value, and to output a target value attaining signal to the controller when the electric current attains the target value, wherein the controller determines the transfer voltage when the target value attaining signal is input as the transfer voltage to be used in the printing mode.

The current detecting portion may detect the electric current from the effective resistance value of the transfer roller and the photosensitive medium that varies with factors such as an external temperature, paper type, dust, and toner.

The image printing apparatus may further include a light detecting portion to monitor a portion of the light emitted from the light source and output a signal corresponding to the monitored light. The controller determines the driving voltage of the light source in the printing mode by using signal output from the light detecting portion.

The foregoing and/or other aspects of the present invention may also be achieved by providing a photosensitive medium; a light scanning unit including a light source to emit a light beam onto the photosensitive medium; a developing portion to develop an electrostatic latent image formed on the photosensitive medium by the light scanning unit with a developer; and a transfer roller to transfer the image developed on the photosensitive medium with the developer to a fed paper, the method including determining a transfer voltage to be supplied to the transfer roller, corresponding to an effective resistance of the transfer roller and the photosensitive medium; and determining a driving voltage of the light source for a printing mode according to information of printing engine driving condition variables including the determined transfer voltage.

The determining of the driving voltage of the light source may use an intensity of the light emitted from the light source and a voltage supplied to the light source as the printing engine driving condition variable.

The determining of the driving voltage of the light source may also include determining a first driving voltage of the light source corresponding to the determined transfer voltage and external temperature information; driving the light source with the first driving voltage of the light source; detecting an amount of the light emitted from the light source; adjusting the first driving voltage to compensate for an error between the detected amount of light and a target amount of the light corresponding to the first driving voltage; and determining the adjusted voltage as the driving voltage of the light source in the printing mode.

BRIEF DESCRIPTION OF THE DRAWINGS

These and/or other aspects and advantages of the invention will become apparent and more readily appreciated from the following description of the preferred embodiments, taken in conjunction with the accompanying drawings of which.

DETAILED DESCRIPTION OF THE PREFERRED EMBODIMENTS

Figure 1:
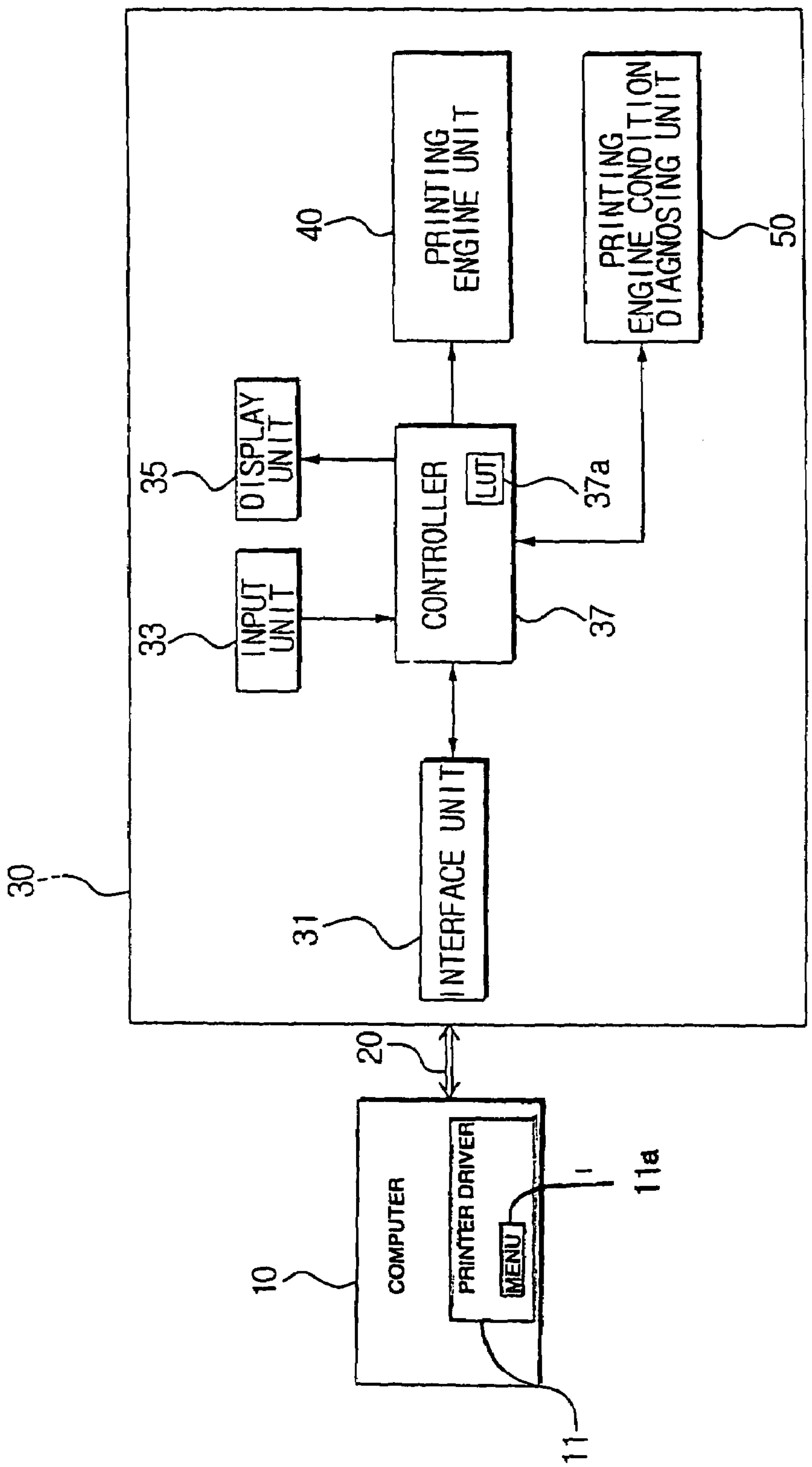
FIG. 1 is a block diagram showing an image printing system employing an image printing apparatus according to an embodiment of the present invention.

Reference will now be made in detail to the present preferred embodiments of the present invention, examples of which are illustrated in the accompanying drawings, wherein like reference numerals refer to like elements throughout.

FIG. 1 is a block diagram showing an image printing system employing an image printing apparatus according to an embodiment of the present invention.

Referring to FIG. 1, an image printing system includes a computer 10 and an image printing apparatus 30 connected to the computer 10 via a communication interface 20. The computer 10 is a representative example of an external device that transmits printing data to the image printing apparatus 30. Another example of an external device which can connect to the image printing apparatus 30 is a scanner (not shown). The computer 10 is provided with a printer driver 11 installed in a memory (not shown) thereof. The printer driver 11 provides a menu to set a printing condition, and converts a selected file to be printed to the printing data that is appropriately processed by the image printing apparatus 30 and transmits the data to the image printing apparatus 30 via the communication interface 20.

The printer driver 11 may provide a menu 11*a* that enables a user to select an effective resistance value between a photosensitive drum 41 (FIG. 2) and a transfer roller 45 to determine a driving condition of a printing engine unit 40 of the image printing apparatus 30. For example, the printer driver 11 provides the menu 11*a* through which a user selects a variation of image clarity, i.e., brightness. The printer driver 11 transmits to the image printing apparatus 30 the selected effective resistance value as the effective resistance set information. The image printing apparatus 30 processes the received printing data to record a corresponding image onto recording paper. The image printing apparatus 30 includes an interface unit 31, an input unit 33, a display unit 35, a controller 37, a printing engine unit 40 and a printing engine condition diagnosing unit 50.

Figure 2:
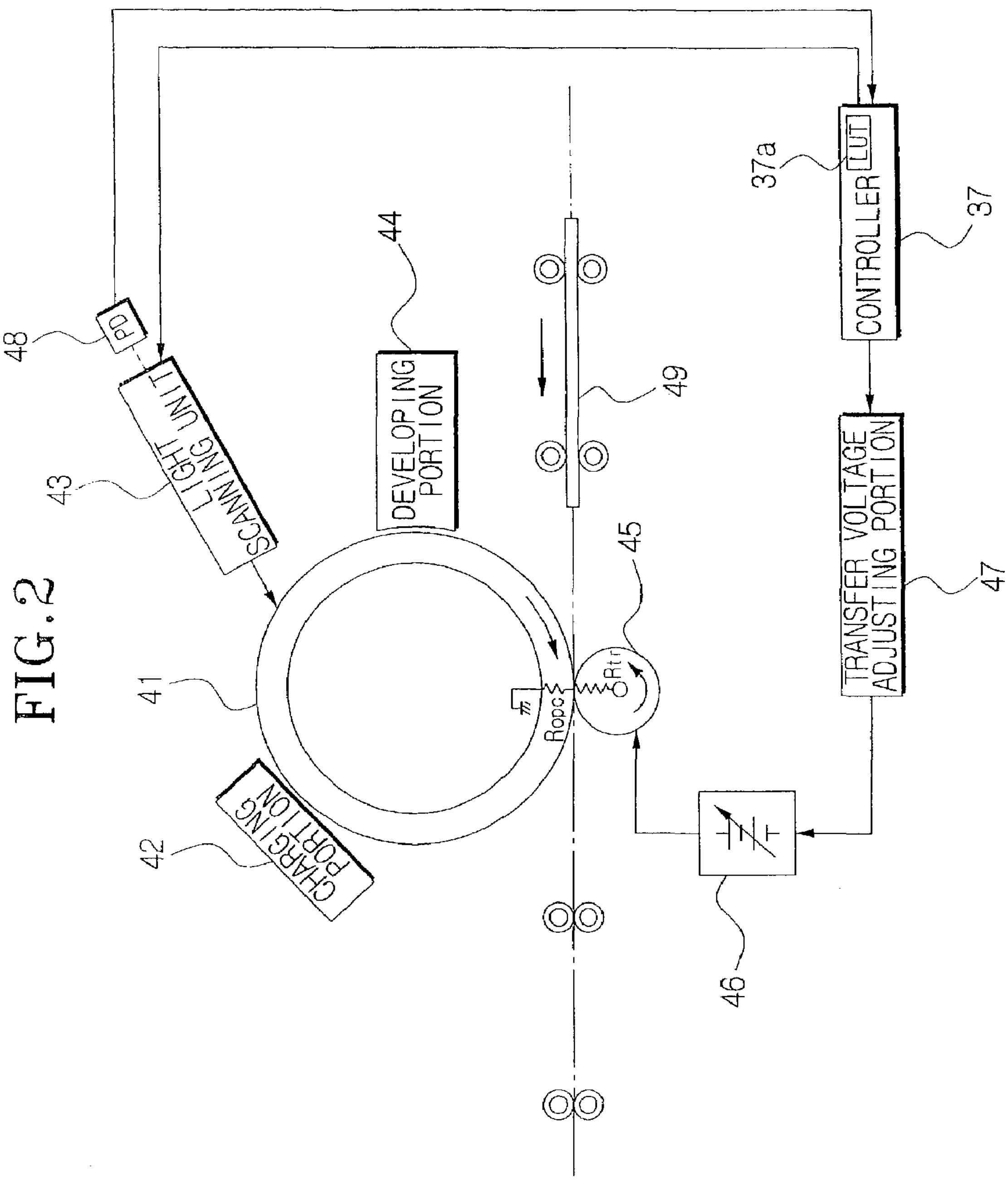
FIG. 2 is a view showing a portion of the image printing apparatus of FIG. 1.

The interface unit 31 supports a signal communication between the external device, i.e., the computer 10 and the controller 37 via the communication interface 20. The interface unit 31 has a plurality of keys to set various functions that are supported by the image printing apparatus 30. The input unit 31 may have a key to set the variation of the image clarity, i.e. the brightness, corresponding to the effective resistance value. The display unit 35 displays display information under the control of the controller 37. The printing engine unit 40 performs printing under the control of the controller 37. The printing engine unit 40 includes a paper feeding portion (not shown), a light scanning unit 43, the photosensitive drum 41, and the transfer roller 45 see (FIG. 2). The printing engine unit 40 also includes a charging portion 42 and a developing portion 44.

The charging portion 42 electrically charges the photosensitive drum 41, which serves as a photosensitive medium, to a predetermined electric potential. The light scanning unit 43 projects light corresponding to the printing data onto the photosensitive drum 41 under the control of the controller 37. A photodetector (PD) 48 detects a part of the light emitted from a light source installed in the light scanning unit 43 and provides feedback from the detected partial light to the controller 37. The developing portion 44 develops an electrostatic latent image formed on the photosensitive drum 41 by the light scanning unit 43 with a developer having an electric charge. The transfer roller 45 prints the developed image of the photosensitive drum 41 onto incoming printing paper 49 while rotating in contact with the photosensitive drum 41. The symbol 'Rtr' in the drawing indicates an effective resistance of the transfer roller 45, while 'Ropc' indicates the effective resistance of the photosensitive drum 41. A voltage-varying portion 46 changes the voltage of the transfer roller 45 and supplies the same to the transfer roller 45. A transfer voltage adjusting portion 47 controls the voltage-varying portion 46 to supply a voltage corresponding to a control signal input from the controller 37 to the transfer roller 45.

The printing engine condition diagnosing portion 50 obtains the effective resistance value between the photosensitive drum 41 and the transfer roller 45. The printing engine state diagnosing portion 50 may detect an electric current flowing through a path that is connected from the transfer roller 45 to the photosensitive drum 41, and outputs a signal corresponding to the electric current.

Figure 3:
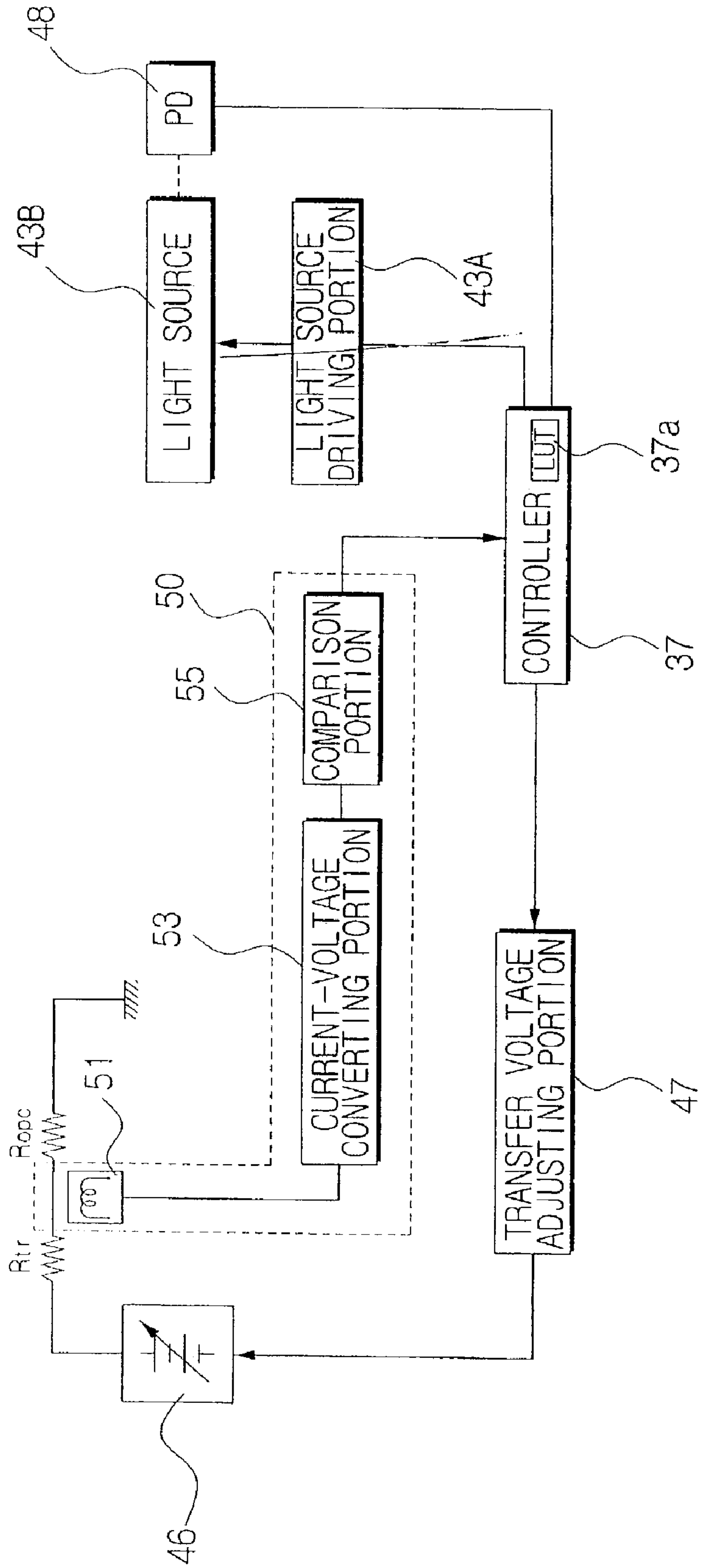
FIG. 3 is a block diagram showing an example of a printing engine state diagnosing portion to detect an effective resistance occurring between a photosensitive medium and a transfer roller according to the embodiment of the present invention.

An example of the printing engine state diagnosing portion 50 is shown in FIG. 3. Referring to FIG. 3, the printing engine state diagnosing portion 50 includes a current detector 51, a current-voltage converting portion 53, and a comparison portion 55. The current detector 51 is disposed on a path between the transfer roller 45 and the photosensitive drum 41. The current-voltage converting portion 53 outputs a voltage signal that corresponds to the electric current detected by the current detector 51. The comparison portion 55 compares the voltage output from the current-voltage converting portion 53 with a reference voltage corresponding to a set target current, and outputs to the controller 37 the effective resistance value that corresponds to a result of the comparison. Reference numeral 43A indicates a light source driving portion that adjusts a driving voltage of the light source 43B of the light scanning unit 43 under the control of the controller 37, and controls on/off switching of the light source 43B corresponding to the printing data.

The controller 37 to control the respective components determines respective driving conditions of the components of the printing engine unit 40 according to the effective resistance value of the printing engine unit 40. According to the determined driving conditions, the controller 37 controls the printing engine unit 40 to perform the printing. At this point, an initializing process to determine the driving conditions of the printing engine unit 40 is referred to as a printing engine driving condition determining mode, and a mode to perform the printing according to the determined driving conditions is referred to as a printing mode. The printing engine driving condition determining mode is activated when the image printing apparatus 30 is turned on or when the image printing apparatus 30 receives the printing data from the external device.

In the printing engine driving condition determining mode, a variable of the printing engine driving condition includes a transfer voltage of the transfer roller 45 and a driving voltage of the light source 43B.

The controller 37 utilizes the effective resistance occurring between the transfer roller 45 and the photosensitive drum 41, and optical output change characteristics of the light source 43B as the variables of the printing engine driving condition.

The effective resistance value varies with factors such as an external temperature, toner and the like. Alternatively, the variation of the image clarity, i.e., the brightness, corresponding to the effective resistance value can be selected by a user through the printer driver 11 or the input unit 33.

On a lookup table (LUT) 37*a* of the controller 37 information is recorded regarding the driving voltage to be supplied to the light source 43B corresponding the transfer voltage.

Hereinafter, a description will be made about a process of obtaining the driving condition variable information and determining the driving conditions of the printing engine unit 40 by utilizing the obtained variable information, with reference to FIG. 5.

Figure 5:
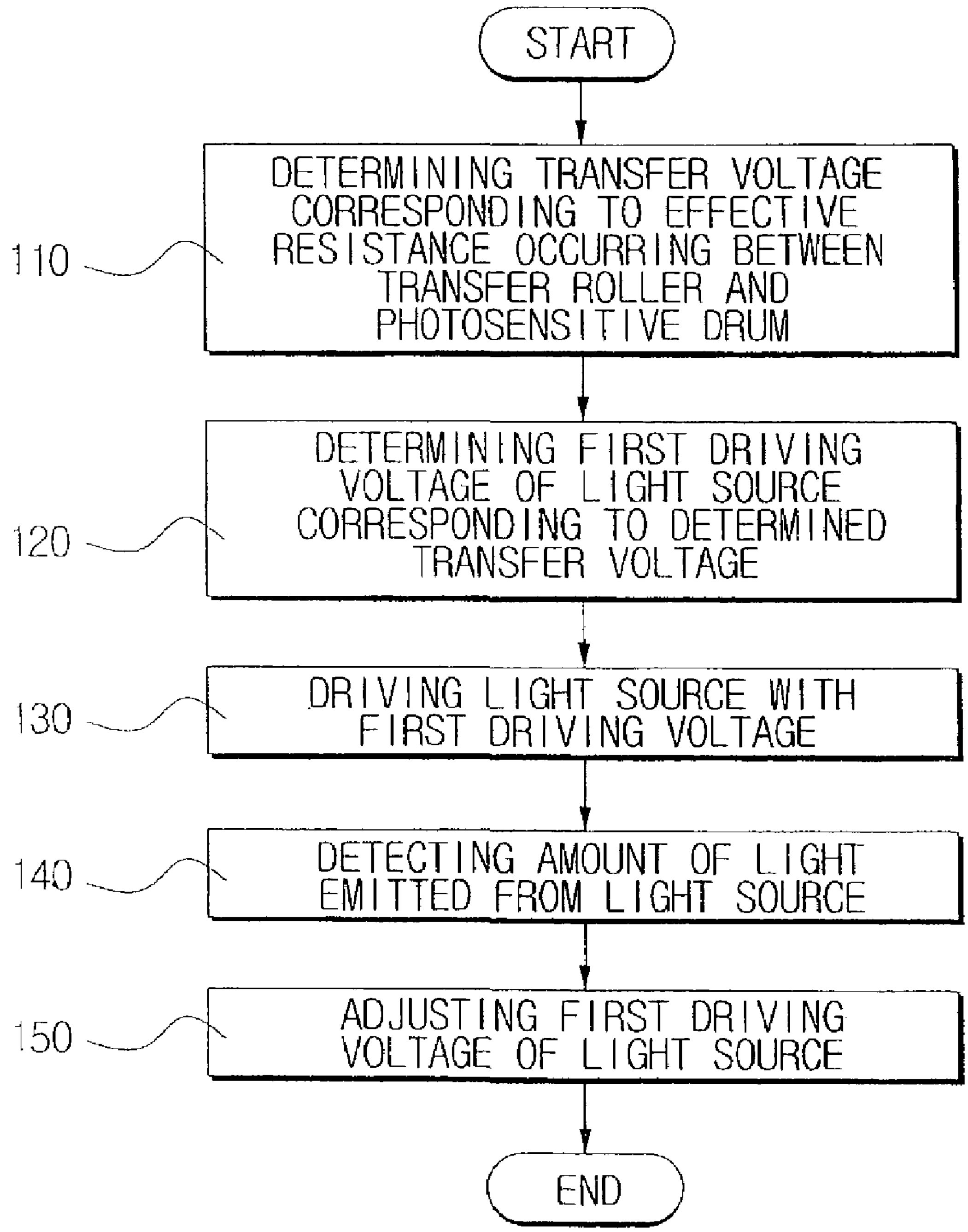
FIG. 5 is a flowchart showing a controlling method of an image printing apparatus according to the embodiment of present invention.

FIG. 5 is a flowchart showing a control method of the image printing apparatus according to the embodiment of the present invention. As shown in FIG. 5, the controller 37 determines a transfer voltage corresponding to an effective resistance occurring between the transfer roller 45 and the photosensitive drum 41 (110).

Figure 4:
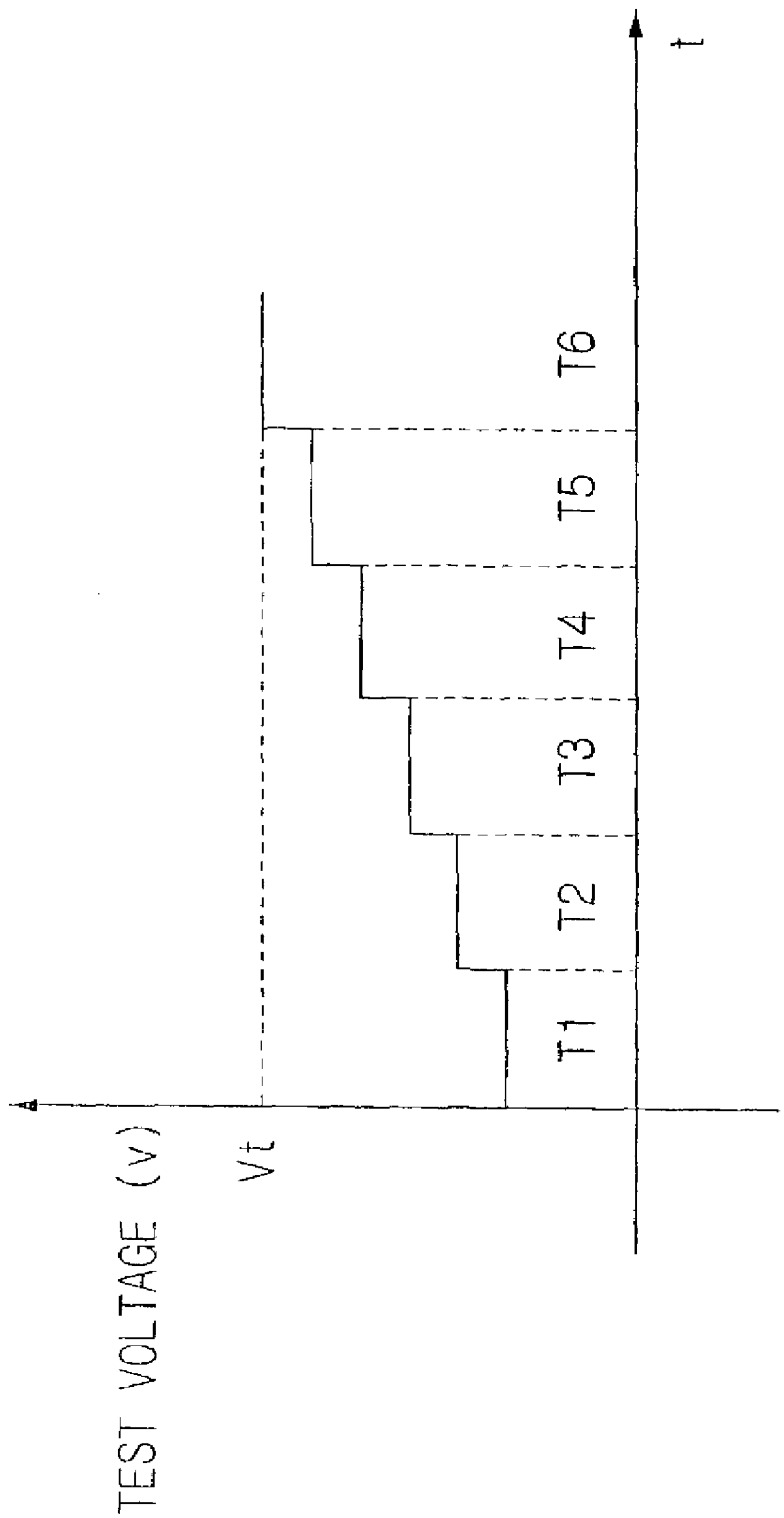
FIG. 4 is a graph showing an example of a test voltage pattern supplied to a transfer roller in a printing engine driving condition determining mode according to the embodiment of the present invention.

For more detailed descriptions of the determination of the transfer voltage, the controller 37 controls the transfer voltage adjusting portion 47 to supply a test voltage which increases at a predetermined pattern to the transfer roller 45. The test voltage may increase in a stepped pattern, as shown in FIG. 4.

Next, the controller 37 supplies the transfer roller 45 with a voltage which gradually increases according to the pattern of the test voltage, and determines the voltage applied to the transfer roller 45 when receiving a signal corresponding to a set reference electric current from the comparison portion 55 as a transfer voltage. An example is shown in FIG. 4 during the process of increasing the voltage in the stepped pattern to be supplied to the transfer roller 45. The controller 37 receives from the comparison portion 55 the result that the electric current corresponding to the reference electric current set at the time T6 is detected by the current detecting portion 51. Then, the controller 37 determines that the voltage Vt supplied to the transfer roller 45 at the time T6 as a transfer voltage is supplied to the transfer roller 45 in the printing mode.

As the transfer voltage is determined to be supplied to the transfer roller 45, causing a current corresponding to the reference voltage set for the current-flowing path between the transfer roller 45 and the photosensitive drum 41, the conditions required to form the electrostatic latent image on the photosensitive drum 41 and to transfer the electrostatic latent image developed by the developer having an electric charge to the paper can be consistently maintained.

If the transfer voltage is determined during the printing operation, a first driving voltage of the light source 43B is first determined by using the transfer voltage of the transfer roller (120). The first driving voltage of the light source 43B corresponding to the determined transfer voltage is stored in the lookup table 37*a* of the controller 37.

The controller 37 reads the first driving voltage corresponding to the determined transfer voltage information from the lookup table 37*a*, and first determines the first driving voltage of the light source 43B.

The controller 37 drives the light source 43*b* with the first driving voltage (130), and detects an amount of the light emitted from the photodetector (PD) 48 (140).

After that, the controller 37 determines whether there is an error between the amount of the light detected by the photodetector (PD) 48 and a target amount of the light corresponding to the first driving voltage of the light source 43B. If there is an error, the controller 37 fine-adjusts the first driving voltage of the light source 43B to compensate for the error, and then determines a second driving voltage of the light source 43B to be supplied in the printing mode (150). For example, if the amount of the light detected by the photodetector (PD) 48 is less than the target amount of the light corresponding to the first driving voltage, the controller adds a predetermined voltage to the first driving voltage and then determines the added voltage as the second driving voltage. The driving voltage adjustment in operation 150 can be repeated by a general error adjusting method using a negative feedback until the error becomes smaller than a set reference value.

In a transfer voltage determining method according to another aspect of the present invention, a predetermined voltage is supplied to the transfer roller 45. An effective resistance is obtained between the photosensitive drum 41 and the transfer roller 45 based on an electric current value output from the current detecting portion 51, and a transfer voltage of the transfer roller 45 is determined corresponding the obtained effective resistance. This method simply requires transfer voltage data that corresponds to the effective resistance between the photosensitive drum 41 and the transfer roller 45 to be recorded on the lookup table 37*a*. With this method, the comparison portion 55 may be omitted.

According to the image printing apparatus and a method of controlling the same of the embodiment of the present invention, since the driving condition of the printing engine is adjusted according to the changed environment of the system, the deterioration of the printing quality can be prevented.

Although a preferred embodiment of the present invention has been shown and described, it will be appreciated by those skilled in the art that changes may be made in this embodiment without departing from the principles and spirit of the invention, the scope of which is defined in the claims and their equivalents.

What is claimed is:

1. An image printing apparatus comprising:

a photosensitive medium;

a light scanning unit including a light source to emit a light beam onto the photosensitive medium;

a developing portion to develop an electrostatic latent image formed on the photosensitive medium by the light scanning unit with a developer;

a transfer roller to transfer the image developed on the photosensitive medium with the developer to a fed paper;

a printing engine state diagnosing portion to detect an effective resistance value of the photosensitive medium and the transfer roller;

a controller to determine a transfer voltage to be supplied to the transfer roller to print according to the effective resistance value in a printing engine driving condition determining mode, and to determine a driving voltage for a printing mode with respect to the light source of the light scanning unit based on the determined transfer voltage; and a light source drive unit to drive the light source according to the driving voltage in the printing mode under the control of the controller.

2. The image printing apparatus of claim 1, further comprising a transfer voltage adjusting portion to variably adjust the transfer voltage, wherein the controller controls the transfer voltage adjusting portion to supply a test voltage to the transfer roller, the test voltage increasing in a predetermined pattern, and the printing engine state diagnosing portion detects the effective resistance value in the printing engine driving condition determining mode.

3. The image printing apparatus of claim 2, wherein the printing engine state diagnosing portion comprises:

a current detecting portion to detect an electric current flowing from the transfer roller to the photosensitive medium corresponding to the test voltage; and a comparison portion to compare the electric current detected by the current detecting portion with a preset target value, and to output a target value attaining signal to the controller when the detected electric current attains the target value, wherein the controller determines the transfer voltage when the target value attaining signal is input as the transfer voltage to be used in the printing mode.

4. The image printing apparatus of claim 3, further comprising a light detecting portion to monitor a portion of the light emitted from the light source and to output a signal corresponding to the monitored portion of the light, wherein the controller determines the driving voltage of the light source in the printing mode by using the signal output from the light detecting portion.

5. The image printing apparatus of claim 4, wherein the controller determines the driving voltage of the light source in the printing mode by using the transfer voltage of the transfer roller and the signal output from the light detecting portion.

6. A method of controlling an image printing apparatus which comprises a photosensitive medium, a light scanning unit including a light source to emit a light beam onto the photosensitive medium, a developing portion to develop an electrostatic latent image formed on the photosensitive medium by the light scanning unit with a developer, and a transfer roller to transfer the image developed on the photosensitive medium with the developer to a fed paper, the method comprising:

determining a transfer voltage to be supplied to the transfer roller, corresponding to an effective resistance of the transfer roller and the photosensitive medium; and determining a driving voltage of the light source for a printing mode according to information of a first printing engine driving condition variable including the determined transfer voltage.

7. The method of claim 6, wherein the determining of the driving voltage of the light source comprises using an intensity of the light emitted from the light source and a voltage supplied to the light source as second and third printing engine driving condition variables.

8. The method of claim 7, wherein the determining of the driving voltage of the light source comprises:

determining a first driving voltage of the light source corresponding to the determined transfer voltage and external temperature information;

driving the light source with the first driving voltage of the light source;

detecting an amount of the light emitted from the light source;

adjusting the first driving voltage to compensate for an error between the detected amount of light and a target amount of the light corresponding to the first driving voltage; and determining the adjusted voltage as the driving voltage of the light source in the printing mode.

9. The method of claim 6, wherein the determining of the transfer voltage comprises:

selecting an effective resistance value from a menu; and determining the transfer voltage according to the selected effective resistance value.

10. An apparatus comprising:

a photosensitive medium to receive an image to be developed with a developer;

a transfer roller to transfer the developed image to a paper;

a detector to detect an effective resistance of the photosensitive medium and the transfer roller;

a controller to determine a transfer voltage to be supplied to the transfer roller according to the detected effective resistance; and a light source to emit a light beam onto the photosensitive medium to generate the image to be developed by the developer, wherein the controller determines a driving voltage of the first light source based upon the determined transfer voltage.

11. The apparatus of claim 10, further comprising:

a current detecting portion to detect an electric current flowing from the transfer roller to the photosensitive medium corresponding to a test voltage generated by the controller; and a comparison portion to compare the detected electric current with a target value, wherein the controller determines the transfer voltage based upon the comparison of the detected electric current with the target value.

12. The apparatus of claim 10, wherein the controller comprises a lookup table to store the driving voltage corresponding to the determined transfer voltage.

13. A method comprising:

receiving and developing an image an a photosensitive medium with a developer;

transferring the developed image to a paper with a transfer roller;

detecting an effective resistance of the photosensitive medium and the transfer roller;

determining a transfer voltage to be supplied to the tranfer roller according to the detected effective resistance;

emitting a light beam onto the photosensitive medium to generate the received image; and determining a driving voltage of the light beam based upon the determined transfer voltage.

14. An apparatus comprising:

a photosensitive medium;

a light source to emit a light beam onto the photosensitive medium to form an image to be developed by a developer;

a transfer roller to transfer the developed image to a paper to thereby print the developed image;

a detector to detect an effective resistance of the photosensitive medium and the transfer roller; and a controller to determine a transfer voltage to be supplied to the transfer roller according to the detected effective resistance and a driving voltage of the light source based upon the determined transfer voltage.

* * * * *

UNITED STATES PATENT AND TRADEMARK OFFICE

CERTIFICATE OF CORRECTION

PATENT NO. : 7,010,238 B2
APPLICATION NO. : 10/453615
DATED : March 7, 2006
INVENTOR(S) : Young-gook Park It is certified that error appears in the above-identified patent and that said Letters Patent is hereby corrected as shown below:

On Title Page, Column 2, line 1, Item (56) (Foreign Patent Documents), after "4/2001", insert --G03G 15/00--;

Title Page Item (56)
Column 2, line 2, (Foreign Patent Documents), after "4/2002", insert --G03G 15/16--;

Title Page Item (56)
Column 2, line 3, (Foreign Patent Documents), after "1/2003", insert --G03G 15/16--;

On Title Page Item (57)
Column 2, line 2, (Abstract) after "medium", delete ",";

Column 8, line 50, Claim 10, delete "first" before "light";

Column 9, line 2, Claim 13, after "image" replace "an" with --on--, therefor;

Column 13, line 9, replace "transfer" with --transfer--, therefore.

Signed and Sealed this

Twenty-ninth Day of August, 2006

JON W. DUDAS
*Director of the United States Patent and Trademark Office*